United States Patent
Kao et al.

[11] Patent Number: 6,157,601
[45] Date of Patent: Dec. 5, 2000

[54] AUTO GAIN ADJUSTMENT APPARATUS AND METHOD FOR FOCUSING AND TRACKING CONTROL OF THE OPTICAL PICKUP OF AN OPTICAL DISC DRIVE

[75] Inventors: Chih-Hsien Kao, Pan-Chiao; Sheng-Yunn Wang, Tai-Ping, both of Taiwan

[73] Assignee: Media Tek Inc., Hsinchu, Taiwan

[21] Appl. No.: 09/056,163

[22] Filed: Apr. 6, 1998

[30] Foreign Application Priority Data

Jan. 21, 1998 [TW] Taiwan ................................ 87100771

[51] Int. Cl.[7] .................................................. G11B 7/095
[52] U.S. Cl. .................................... 369/44.35; 369/44.36
[58] Field of Search .............................. 369/44.26, 44.29, 369/44.35, 44.36

[56] References Cited

U.S. PATENT DOCUMENTS

| | | | |
|---|---|---|---|
| 5,559,772 | 9/1996 | Takeda ................................ | 369/44.36 |
| 5,600,615 | 2/1997 | Kiyoura et al. ................... | 369/44.36 X |
| 5,764,605 | 6/1998 | Zucker et al. .................... | 369/44.36 X |
| 5,974,009 | 10/1999 | Tamura et al. ....................... | 369/44.29 |

*Primary Examiner*—Aristotelis M. Psitos
*Attorney, Agent, or Firm*—Thomas, Kayden, Horstemeyer & Risley

[57] ABSTRACT

An auto gain adjustment apparatus and method are provided for the focusing/tracking control of the optical pickup of an optical disc drive. The gain is obtained by utilizing the self-sustained oscillation from a non-linear component in the optical disc drive, such as a relay circuit with hysteresis. This gain adjustment apparatus and method is more advantageous than the prior art in that the gain can be automatically adjusted without involving manual work and the need to apply an externally generated oscillating test signal. The apparatus and method therefore allows the manufacture and utilization of the optical disc drive to be more efficient and cost-effective.

10 Claims, 4 Drawing Sheets

AUTO GAIN ADJUSTMENT APPARATUS AND METHOD FOR FOCUSING AND TRACKING CONTROL OF THE OPTICAL PICKUP OF AN OPTICAL DISC DRIVE

CROSS-REFERENCE TO RELATED APPLICATION

This application claims the priority benefit of Taiwan application serial no. 87100771, filed Jan. 21, 1998, the full disclosure of which is incorporated herein by reference.

BACKGROUND OF THE INVENTION

1. Field of the Invention

This invention relates to servo control for the optical pickup of optical disc drives, and more particularly, to an auto gain adjustment apparatus and method for use in the focusing/tracking control of the optical pickup of an optical disc drive.

2. Description of Related Art

The optical disc is a mass storage medium that can hold up to several megabits or even gigabits of binary data in a single piece of plastic disc, which is several times larger than a conventional magnetic disk can hold. Due to its high capacity, the optical disc is now widely used in the computer arena as the major data storage medium.

An optical disc drive is composed of a large number of constituent parts including motors and optical and electronic components. In operation, the characteristics of these constituent parts can change in time and are affected by various environmental conditions. The changes in the characteristics can then affect the gain of the servo control loop for focusing/tracking control of the optical pickup of the optical disc drive. Moreover, the gain can be further affected by changes in the optical properties of the photo sensors and the reflectivity of the optical disc being used. Therefore, the gain of the servo control loop should be always adaptively adjusted to compensate for any changes in the system characteristics before being put into actual operation so as to allow the optical disc drive to operate without errors in focusing and tracking.

The adjustment of the gain of the servo control loop in the optical disc drive is conventionally done in either of the following two ways: either through manual adjustment, or through the application of an externally generated oscillating test signal, such as a sinusoidal signal or a square pulse train, to the system. It is apparent that the manual adjustment would be highly cost-ineffective since it would involve great amounts of labor works. The latter method is more advantageous in terms of efficiency, but is still unsatisfactory in that the application of the externally generated oscillating test signals to the system is still quite inconvenient and time-consuming. This drawback will be illustratively depicted in the following with reference to FIG. 1.

FIG. 1 is a schematic block diagram of a conventional gain adjustment apparatus for adapatively adjusting the gain of the servo control loop for focusing/tracking control of the optical pickup of an optical disc drive. As shown, the gain adjustment apparatus includes a bandpass filter (BPF) 10, a adder 101, a sinusoidal signal generator 11, a phase comparator 12, an averaging circuit 13, a judgment circuit 14, and a gain adjusting unit 15 with a variable gain K under control by the judgment circuit 14.

The input signal to this gain adjustment apparatus is denoted by FE/TE (focusing/tracking error), which is outputted from the optical pickup (not shown) of the optical disc drive during focusing/tracking operation. The FE/TE signal is first processed by the BPF 10 which can filter out all the undesired frequency components beyond the designated bandwidth of the FE/TE signal. The FE/TE signal is also added with an output of the sinusoidal signal generator 11 by the adder 101, and then a mixed FE/TE signal is generated. The phase comparator 12 then compares the phase of the output of the BPF 10 with the phase of the output of the sinusoidal signal generator 11. The output of the phase comparator 12 is then averaged by the averaging circuit 13 which sends the averaged value to the judgment circuit 14. In response, the judgment circuit 14 generates a corresponding gain control signal based on the output of the averaging circuit 13. The gain control signal is then sent to the gain adjusting unit 15 to control the gain K thereof to a corresponding level in response to the gain control signal so as to cause the gain adjusting unit 15 to amplify the mixed FE/TE signal by the gain K.

One drawback to the foregoing gain adjustment apparatus, however, is that the use of the sinusoidal signal generator 11 is still considered inconvenient, in that externally generated test signals, such as a sinusoidal signal or square pulse train, needs to be applied to measure the system characteristics.

SUMMARY OF THE INVENTION

It is therefore an objective of the present invention to provide an auto gain adjustment apparatus and method for the focusing/tracking servo control of the optical pickup of an optical disc drive, which can automatically adjust for a suitable gain for the servo control loop of the optical pickup without having to involve manual work.

It is another an objective of the present invention to provide an auto gain adjustment apparatus and method for the focusing/tracking servo control of the optical pickup of an optical disc drive, which utilizes the self-sustained oscillation from a relay circuit with a non-linear hysteretic property to measure the system characteristics of the servo control loop of the optical disc drive.

It is still another objective of the present invention to provide an auto gain adjustment apparatus and method for the focusing/tracking servo control of the optical pickup of an optical disc drive, which can automatically adjust for a suitable gain for the servo control loop of the optical pickup without the need to apply an externally generated oscillating test signal.

In accordance with the foregoing and other objectives of the present invention, an auto gain adjustment apparatus and method for the focusing/tracking servo control of the optical pickup of an optical disc drive is provided.

The gain adjustment apparatus according to the invention includes the following constituent elements:

(a) switching means connected to receive the FE/TE signal from the optical pickup, capable of routing the FE/TE signal to a first path when the optical disc drive is operating in a tuning mode and to a second path when the optical disc drive is operating in a normal mode;

(b) a relay circuit coupled to the first path to receive the FE/TE signal from said switching means when operating in the tuning mode, said relay circuit generating a self-sustained oscillating signal in response to the received FE/TE signal;

(c) a comparison circuit coupled to the first path to receive the FE/TE signal from said switching means when operating in the tuning mode, capable of generating a gain control signal in proportion to the difference between the FE/TE signal and a preset reference;

(d) control means coupled to receive the output of said relay circuit when operating in the tuning mode and coupled to receive the FE/TE signal from said switching means when operating in the normal mode, said control means being capable of compensating for the gain and phase of the received signal; and (e) a gain adjusting unit coupled to said control means to receive the compensated FE/TE signal from said control means and having a variable gain adjustable by the gain control signal from said comparison circuit, the gain being sent to the plant of the optical pickup to cause the plant to produce and transfer a corresponding driving signal to the optical pickup so as to control the focusing and tracking operation of the optical pickup.

The gain adjustment method according to the invention includes the following steps:

receiving the focusing/tracking error signal from the optical pickup;

routing the focusing/tracking error signal to a relay circuit to cause the relay circuit to generate a self-sustained oscillating signal, comparing the amplitude level (or power level) of the focusing/tracking error signal with a preset reference value to thereby generate a correspondingly proportional gain;

amplifying the output oscillating signal from the relay circuit by the gain; and applying the amplified oscillating signal to the plant of the optical pickup so as to control the focusing/tracking operation of the optical pickup until the focusing/tracking error signal from the optical pickup is equal in amplitude level (or power level) to the preset reference value.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Principle of the Invention

Fundamentally, there are two reasons for the cause of continuous oscillation in the focusing/tracking servo control system of an optical disc drive: the first is the application of an external periodic oscillating signal which causes the system to be subjected to the continuous oscillation, and the second is the so-called self-sustained oscillation, which is the limit cycle due to the existence of a non-linear property, for example hysteresis, in the system. The invention is based on the self-sustained oscillation caused by a constituent component with a non-linear property, such as a relay circuit with hysteresis.

Figure 1:
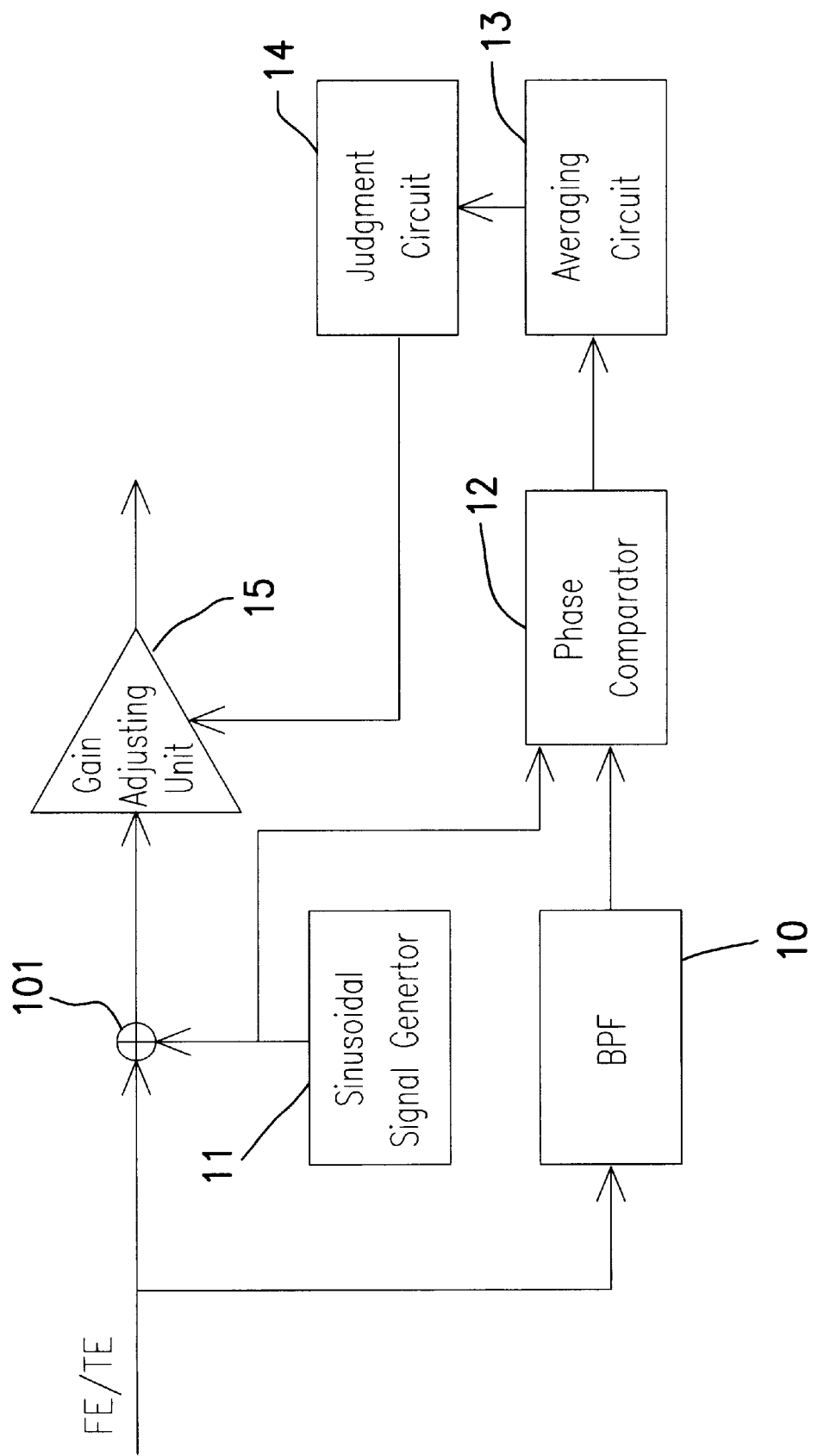
FIG. 1 is a schematic block diagram of a conventional gain adjustment apparatus for the focusing/tracking servo control of the optical pickup of an optical disc drive.
Figure 2A:
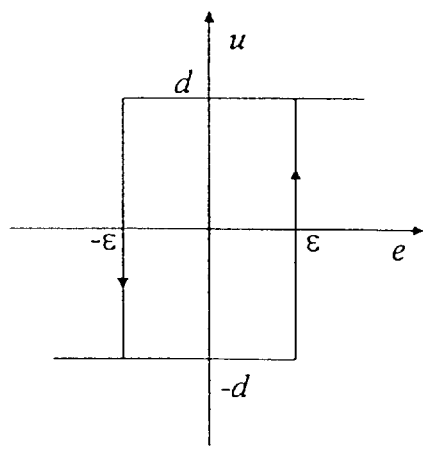
FIG. 2A is a graph, showing the output-to-input characteristic of a relay circuit with hysteresis.

FIG. 2A shows the hysteresis curve of a typical relay circuit whose output-to-input characteristic can be expressed by the following equation:

$$u(t) = \varphi(e(t)) = \begin{cases} d, & \text{for } \begin{cases} e(t) > \varepsilon \text{ and} \\ |e(t)| \le \varepsilon, u(t-\Delta t) > 0 \end{cases} \\ -d, & \text{for } \begin{cases} e(t) < \varepsilon \text{ and} \\ |e(t)| \le \varepsilon, u(t-\Delta t) < 0 \end{cases} \end{cases}$$

where
  u(t) is the output signal from the relay circuit;
  e(t) is the input signal to the relay circuit;
  d is the output amplitude; and
  ε is the width of the hysteresis curve.

Figure 2B:
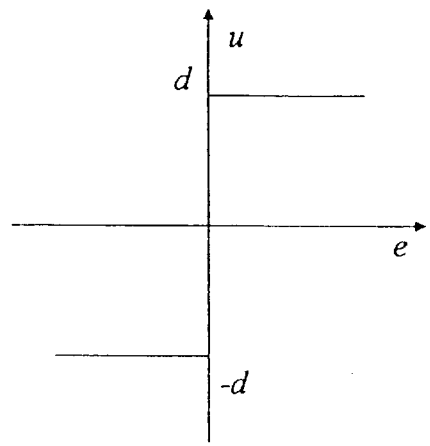
FIG. 2B is a graph, showing the output-to-input characteristic of a relay circuit (a pure relay) without hysteresis.

FIG. 2B shows the hysteresis curve of a pure relay circuit where ε=0, whose output-to-input characteristic can be reduced to the following:

$$u(t) = \varphi(e(t)) = \begin{cases} d, & \text{for } e(t) \ge 0 \\ -d, & \text{for } e(t) < 0 \end{cases}$$

Figure 3:
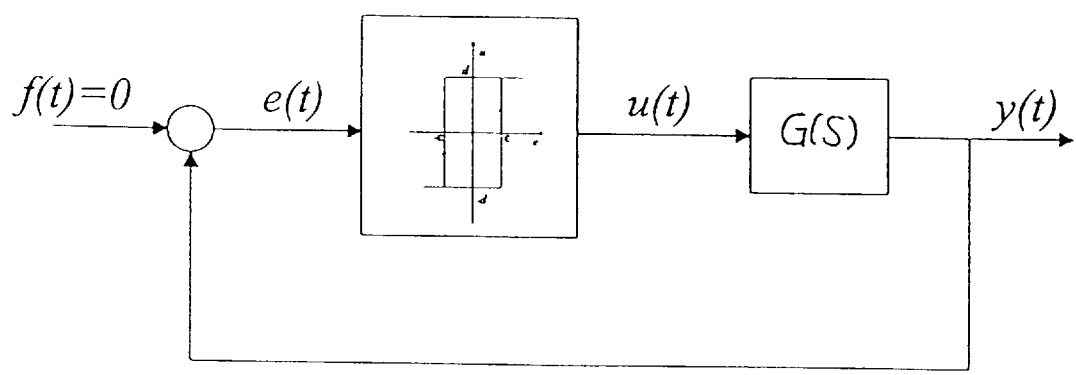
FIG. 3 is a schematic diagram showing the mathematic model of a negative feedback system for the plant of the optical pickup.

FIG. 3 is a schematic diagram showing a negative feedback system for the plant of an optical pickup with a transfer function G(s). If a relay circuit having an input signal indicated by e(t) and an output signal indicated u(t) is incorporated in front of the plant G(s) and the input signal e(t) is a sinusoidal function as follows:

$$e(t^1) = A \cdot \sin(\omega \cdot t),$$

then the describe function N(A) of the relay circuit can be deduced as follows:

$$N(A) = \frac{4d}{\pi A}\left(\frac{\sqrt{A^2-\varepsilon^2}}{A} - j\frac{\varepsilon}{A}\right)$$

In the case of $\epsilon=0$, the above describe function can be reduced to the following:

$$N_0(A) = \frac{4d}{\pi A}$$

In other words, in the case of the input signal e(t) being a sinusoidal signal $A\cdot\sin((\omega\cdot t)$, the relay circuit can provide a combined effect of gain $K=4d/\pi A$ and phase lag ($\phi=\sin^{-1}(\epsilon/A)$, i.e., $$N_i(A) = \frac{4d}{\pi A}e^{-j\varphi}$$

When the relay circuit is subjected to self-sustained oscillation, the characteristic function of the system should satisfy the following condition:

$$I+N(A)\cdot G(j\cdot\omega)=0 \quad (A)$$

Figure 4:
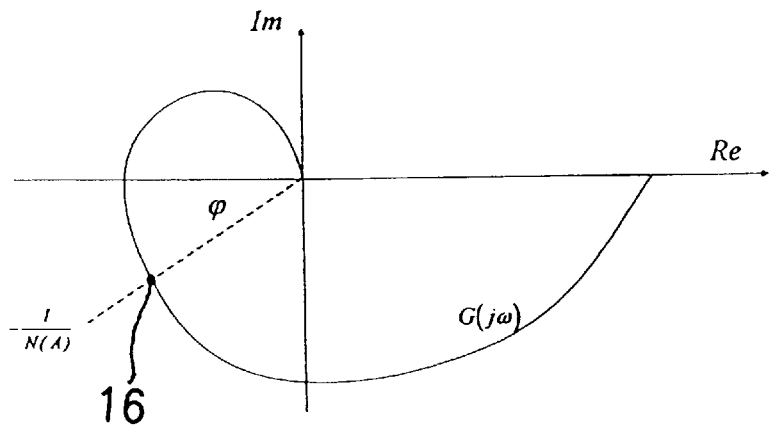
FIG. 4 is a Nyquist diagram used to depict the location of a self-sustained oscillation.
Figure 6A:
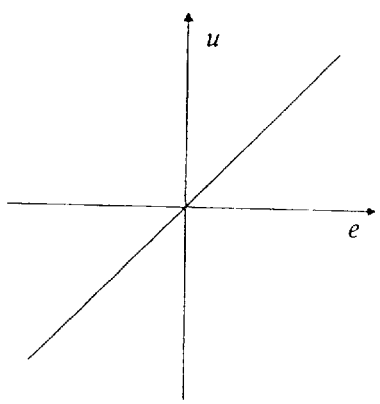
FIG. 6A is a graph, showing the output-to-input characteristic of the relay circuit used in the invention when operating in normal mode.
Figure 6B:
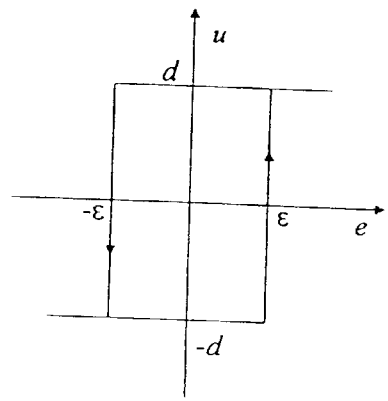
FIG. 6B is a graph, showing the output-to-input characteristic of the relay circuit used in the invention when operating in tuning mode.

FIG. 4 shows the Nyquist diagram of the servo control loop for the optical pickup. The location where the self-sustained oscillation occurs can be obtained by plotting the curve for $-1/N(A)$ and then finding the intersection of the $-1/N(A)$ curve with the Nyquist curve $G(j\cdot\omega)$. In the case of FIG. 4, the intersection point is indicated by the reference numeral 16, which is the location where the self-sustained oscillation occurs.

It can be learned from the foregoing description that a servo control loop with a relay circuit therein will eventually reach the limit cycle that would then cause an undesired consequence of a continuous oscillation. For an ideal servo control system with a relay circuit, its characteristic function satisfies the condition depicted in Equation (A). Therefore, when the control system is subjected to self-sustained oscillation, its gain $M(\omega)$ and phase $\theta(j\cdot\omega)$ are respectively given below:

$$\text{Gain: } M(\omega) = \frac{1}{|N_i(A)|} = \frac{\pi A}{4d} \quad (B)$$

$$\text{Phase: } \theta(j\cdot\omega) = -\angle N_i(A) - \pi$$

In many cases, the system noise can be reduced by providing the relay circuit with a hysteretic property. However, the hysteretic property would then cause an undesirable increase in the phase lag. With the existence of hysteresis, the phase is expressed as follows:

$$\theta(j\cdot\omega)=-\angle N(A)-\pi=\sin^{-1}(\epsilon/A)-\pi$$

Therefore, provided that the output amplitude d and the hysteresis width $\epsilon$ are predetermined known values, the gain and phase can be obtained by measuring the amplitude A and the frequency $\omega$ of the system response.

Moreover, it can be learned from Equation (B) that when the output amplitude d is set at a fixed value, the gain of the servo control loop for the optical pickup is proportional to the amplitude of the oscillating signal. For this reason, it can be concluded that the gain of the servo control loop for the optical pickup can be adapatively adjusted based on the amplitude of the self-sustained oscillation from the relay circuit.

Realization of the Invention

The invention is a realization of the above described principle on the focusing/tracking servo control system for the optical pickup of an optical disc drive. This servo control system includes a tracking servo loop for the tracking error signal and a focusing servo loop for the focusing error signal. Due to the fact that different makes of optical disc drives have different system characteristics, it is desired that the gain of the servo control loop can be adaptively adjusted before actually putting the optical disc drive into operation.

Figure 5:
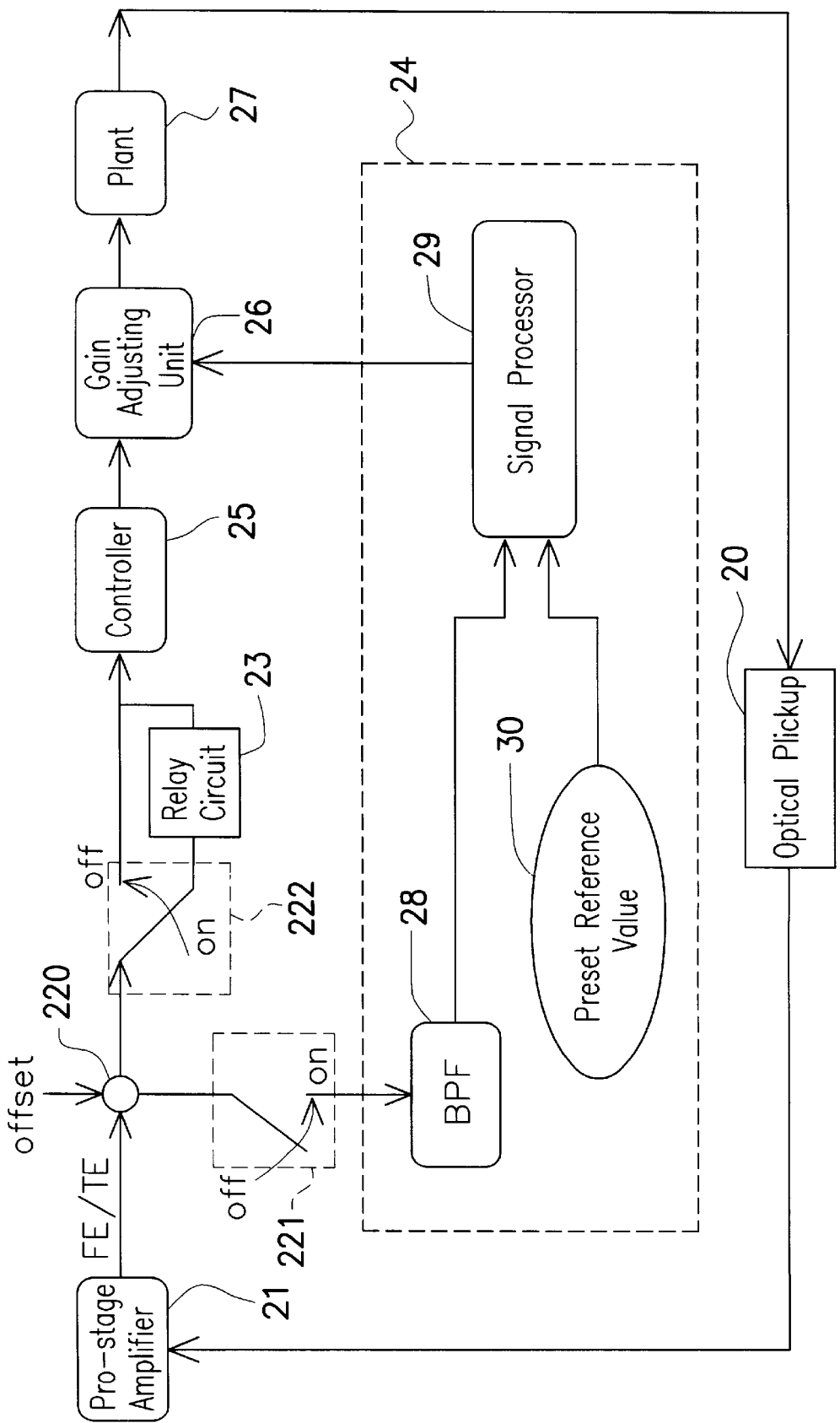
FIG. 5 is a schematic block diagram of the gain adjustment apparatus according to the invention for the focusing/tracking servo control of the optical pickup of an optical disc drive.

FIG. 5 is a schematic block diagram of the gain adjustment apparatus according to the invention for the focusing/tracking servo control of an optical pickup 20. As shown, the gain adjustment apparatus includes a pre-stage amplifier 21, a adder 220, a switch set including a first switch 221 and a second switch 222, a relay circuit 23, a comparison circuit 24 (including a BPF 28, a signal processor 29 and a reference means 30 for setting a reference value), a controller 25 and a gain adjusting unit 26 connected to the plant 27 of the optical pickup 20.

The inside structure of the optical pickup 20 is based on a conventional construction and not within the spirit and scope of the invention, so details thereof will not be given in this specification. Inside the optical pickup 20, the FE/TE signal is generated from the reflection of a laser beam (not shown) from the optical disc (not shown) being accessed by the optical pickup 20. The FE/TE signal is preprocessed by the pre-stage amplifier 21. An offset is then added by adder 220 to the output FE/TE signal from the pre-stage amplifier 21 so as to make the FE/TE signal more stable. The offset FE/TE signal is then routed by the first and second switches 221, 222 either to both the relay circuit 23 and the comparison circuit 24 when the optical disc drive is operating in a tuning mode, or to the controller 25 when the optical disc drive is operating in a normal mode.

In the tuning mode, both the first and second switches 221, 222 are turned to the ON position, which causes the offset FE/TE signal to be routed to both the relay circuit 23 and the comparison circuit 24.

In the comparison circuit 24, the offset FE/TE signal is first received by the BPF 28 which can filter out all the undesired frequency components beyond the designated bandwidth of the FE/TE signal so as to prevent run-out or wobble of the optical pickup. The output of the BPF 28 is then transferred to the signal processor 29. Here the amplitude or power of the FE/TE signal is detected and then compared with the preset reference value 30 to thereby output a corresponding gain control signal to the gain adjusting unit 26. The gain control signal is transferred to the gain adjusting unit 26 which has a variable gain K that can be adjusted by the gain control signal. The gain control signal will keep adjusting the gain K of the gain adjusting unit 26 until the amplitude or power of the FE/TE signal is equal to the preset reference value 30.

Meanwhile, the offset FE/TE signal is routed via the second switch 222 to the relay circuit 23 which in response generates a self-sustained oscillating signal. The output self-sustained oscillating signal from the relay circuit 23 is then transferred to the controller 25 and subsequently to the gain adjusting unit 26 which has the gain K thereof now adaptively adjusted by the gain control signal from the comparison circuit 24 to a suitable level. In response, the gain adjusting unit 26 generates an output proportional to the currently set gain of the gain adjusting unit 26 to serve as a driving signal to the plant 27 so as to drive the optical pickup 20 to the correct position.

In the foregoing feedback control operation, the gain K of the gain adjusting unit 26 is adjusted by the signal processor 29 in such a manner that when the FE/TE signal is unequal in amplitude or power to the preset reference value 30, the signal processor 29 will keep adjusting the gain K of the gain adjusting unit 26 until the comparison result is equal.

If the comparison is based on power, the signal processor 29 is devised in such a manner as to measure the power of the FE/TE signal and then compare it to a preset reference power level. The power of the FE/TE signal can be obtained by an integration method to integrate the waveform of the FE/TE signal so as to obtain the area under the waveform. The method involved in this is a conventional signal processing technique so description thereof will not be further detailed.

When the gain K for the servo control loop of the optical pickup 20 reaches a suitable level, the optical disc drive will be switched to the normal mode, in which the first and second switches 221, 222 will be turned to the OFF position, whereby the offset FE/TE signal is disconnected from both the relay circuit 23 and the comparison circuit 24 and instead routed directly to the controller 25.

In actual application, the foregoing auto gain adjusting operation for the servo control loop of the optical pickup 20 is preferably devised to be carried out every time the optical disc drive is just turned on. In other words, every time the optical disc drive is just turned on, the tuning mode of operation is carried out, and until the gain for the servo control loop of the optical pickup 20 is achieved, the optical disc drive then switches to the normal mode of operation to perform disc access operations.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An apparatus for auto adjustment of the gain of a focusing/tracking servo control loop for the optical pickup of an optical disc drive, the optical pickup being coupled to a plant for focusing/tracking control and generating a focusing/tracking error signal when performing a read operation, said apparatus comprising:

switching means connected to receive the focusing/tracking error signal from the optical pickup, capable of routing the focusing/tracking error signal to a first path when the optical disc drive is operating in a tuning mode and to a second path when the optical disc drive is operating in a normal mode;

a relay circuit coupled to the first path to receive the focusing/tracking error signal from said switching means when operating in the tuning mode, said relay circuit generating a self-sustained oscillating signal in response to the received focusing/tracking error signal;

a comparison circuit coupled to the first path to receive the focusing/tracking error signal from said switching means when operating in the tuning mode, capable of generating a gain control signal in proportion to the difference between the focusing/tracking error signal and a preset reference;

control means coupled to receive the output of said relay circuit when operating in the tuning mode and coupled to receive the focusing/tracking error signal from said switching means when operating in the normal mode, said control means being capable of compensating for the gain and phase of the received signal; and a gain adjusting unit coupled to said control means to receive the compensated focusing/tracking error signal from said control means and having a variable gain adjustable by the gain control signal from said comparison circuit, the gain being sent to the plant of the optical pickup to cause the plant to produce and transfer a corresponding driving signal to the optical pickup so as to control the focusing and tracking operation of the optical pickup.

2. The apparatus of claim 1, wherein said switching means includes:

a first switch coupled between the focusing/tracking error signal and said comparison circuit, said first switch being turned ON when the optical disc drive is operating in the tuning mode and OFF when the optical disc drive is operating in the normal mode; and a second switch which is switchable between a first position connected to said relay circuit and a second position connected to said control means, said second switch being switched to the first position when the optical disc drive is operating in the tuning mode and to the second position when the optical disc drive is operating in the normal mode.

3. The apparatus of claim 1, further comprising:

a pre-stage amplifier, coupled to the optical pickup, for amplifying the focusing/tracking error signal from the optical pickup.

4. The apparatus of claim 3, further comprising; an adder wherein said amplified focusing/tracking error signal from said pre-stage is added by said adder to an offset value to make said amplified focusing/tracking error signal stable.

5. The apparatus of claim 1, wherein said comparison circuit comprises:

a bandpass filter, coupled to receive the focusing/tracking error signal from said switching means, for filtering out undesired frequency components beyond the designated bandwidth of the focusing/tracking error signal.

6. The apparatus of claim 1, wherein said relay circuit is a non-linear device with hysteresis.

7. The apparatus of claim 1, wherein the self-sustained oscillating signal from said relay circuit is proportional to the gain of said gain adjusting unit.

8. A method for auto adjustment of the gain of a focusing/tracking servo control loop for the optical pickup of an optical disc drive, the optical pickup being coupled to a plant for focusing/tracking control and generating a focusing/tracking error signal when performing a read operation, said method comprising the steps of:

receiving the focusing/tracking error signal from the optical pickup;

routing the focusing/tracking error signal to a relay circuit to cause the relay circuit to generate a self-sustained oscillating signal;

comparing the amplitude of the focusing/tracking error signal with a preset reference amplitude to thereby generate a correspondingly proportional gain;

amplifying the output oscillating signal from the relay circuit by the gain; and applying the amplified oscillating signal to the plant of the optical pickup so as to control the focusing/tracking operation of the optical pickup until the focusing/tracking error signal from the optical pickup is equal in amplitude to the preset reference amplitude.

9. A method for auto adjustment of the gain of a focusing/tracking servo control loop for the optical pickup of an optical disc drive, the optical pickup being coupled to a plant for focusing/tracking control and generating a focusing/tracking error signal when performing a read operation, said method comprising the steps of:

receiving the focusing/tracking error signal from the optical pickup;

routing the focusing/tracking error signal to a relay circuit to cause the relay circuit to generate a self-sustained oscillating signal;

comparing the power level of the focusing/tracking error signal with a preset reference power level to thereby generate a correspondingly proportional gain;

amplifying the output oscillating signal from the relay circuit by the gain; and applying the amplified oscillating signal to the plant of the optical pickup so as to control the focusing/tracking operation of the optical pickup until the focusing/tracking error signal from the optical pickup is equal in power to the preset reference power level.

10. The method of claim 9, wherein the power level of the focusing/tracking error signal is determined by integrating the waveform of the focusing/tracking error signal to obtain the area under the waveform of the focusing/tracking error signal.

* * * * *